United States Patent [19]

Yamane et al.

[11] Patent Number: 4,467,647

[45] Date of Patent: Aug. 28, 1984

[54] DIRECT READING TANK GAUGE

[75] Inventors: Kiyoshi E. Yamane, Los Angeles; Timothy C. Thomas, Tustin; Jose J. Tostado, Fullerton, all of Calif.

[73] Assignee: Kaiser Aerospace & Electronics Corporation, Oakland, Calif.

[21] Appl. No.: 432,066

[22] Filed: Sep. 30, 1982

[51] Int. Cl.³ .............................................. G01F 23/12
[52] U.S. Cl. ...................................... 73/321; 73/314; 73/DIG. 5
[58] Field of Search .................... 73/321, DIG. 5, 314

[56] References Cited

U.S. PATENT DOCUMENTS 2,637,111  5/1953  McDuff ............................ 73/321 X
3,283,578  11/1966  Moore ................................. 73/321
3,555,905  1/1971  George ................................. 73/321
4,384,486  5/1983  Eckert ............................. 73/321 X Primary Examiner—Daniel M. Yasich
Attorney, Agent, or Firm—Marvin H. Kleinberg

[57] ABSTRACT

A direct reading tank gauge is made of plastic tape or thin metal in an endless loop. Measuring indicia are applied to one surface of the tape in a display tape assembly. An armature is fixedly mounted to the tape. A tank float is magnetically coupled to the armature, which follows the float and fluid level. A hinged window enables visual observation of tape indicia representing the position of the float, armature and liquid level and removal of the entire display tape assembly for service or repair.

11 Claims, 10 Drawing Figures

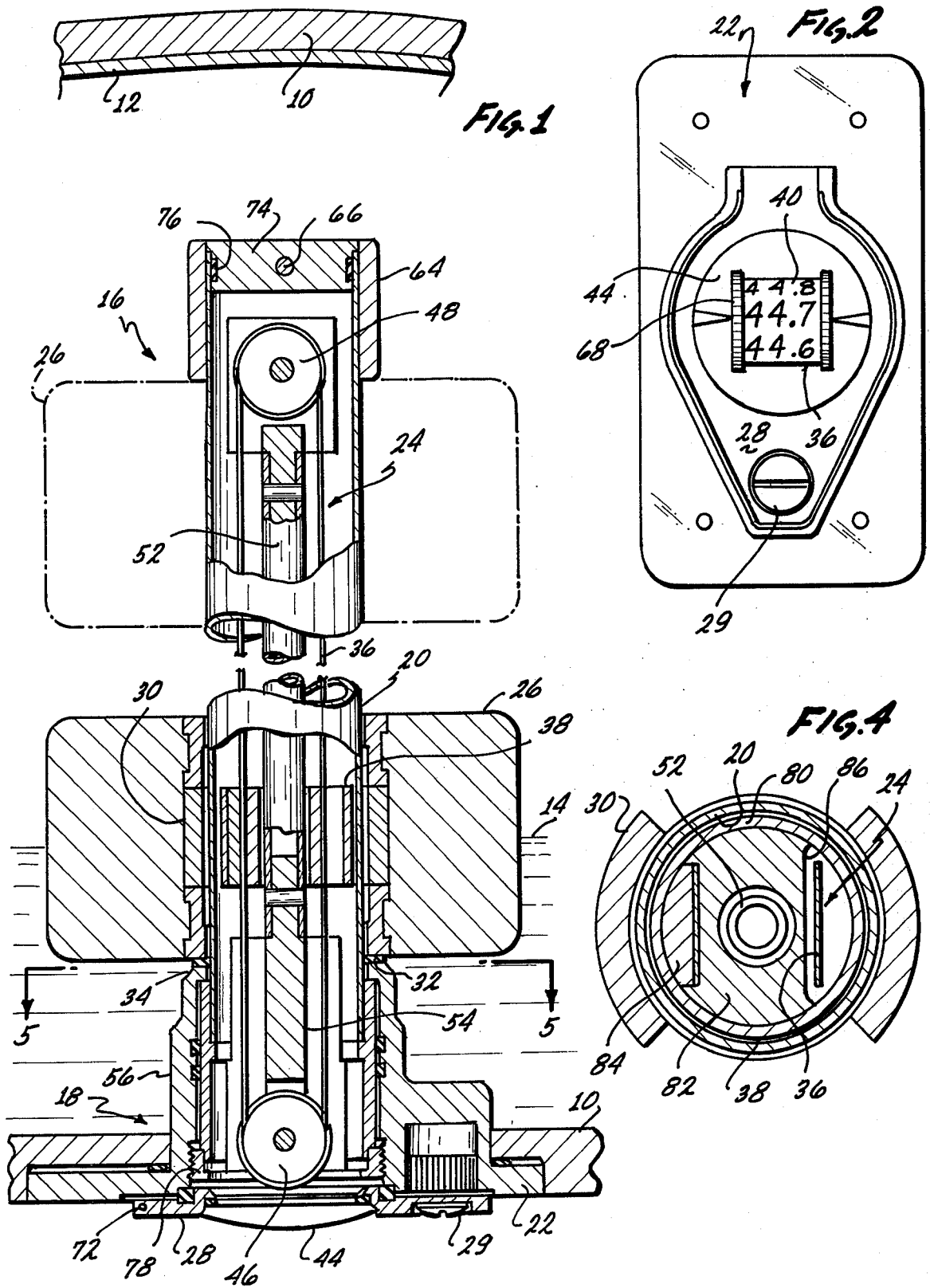

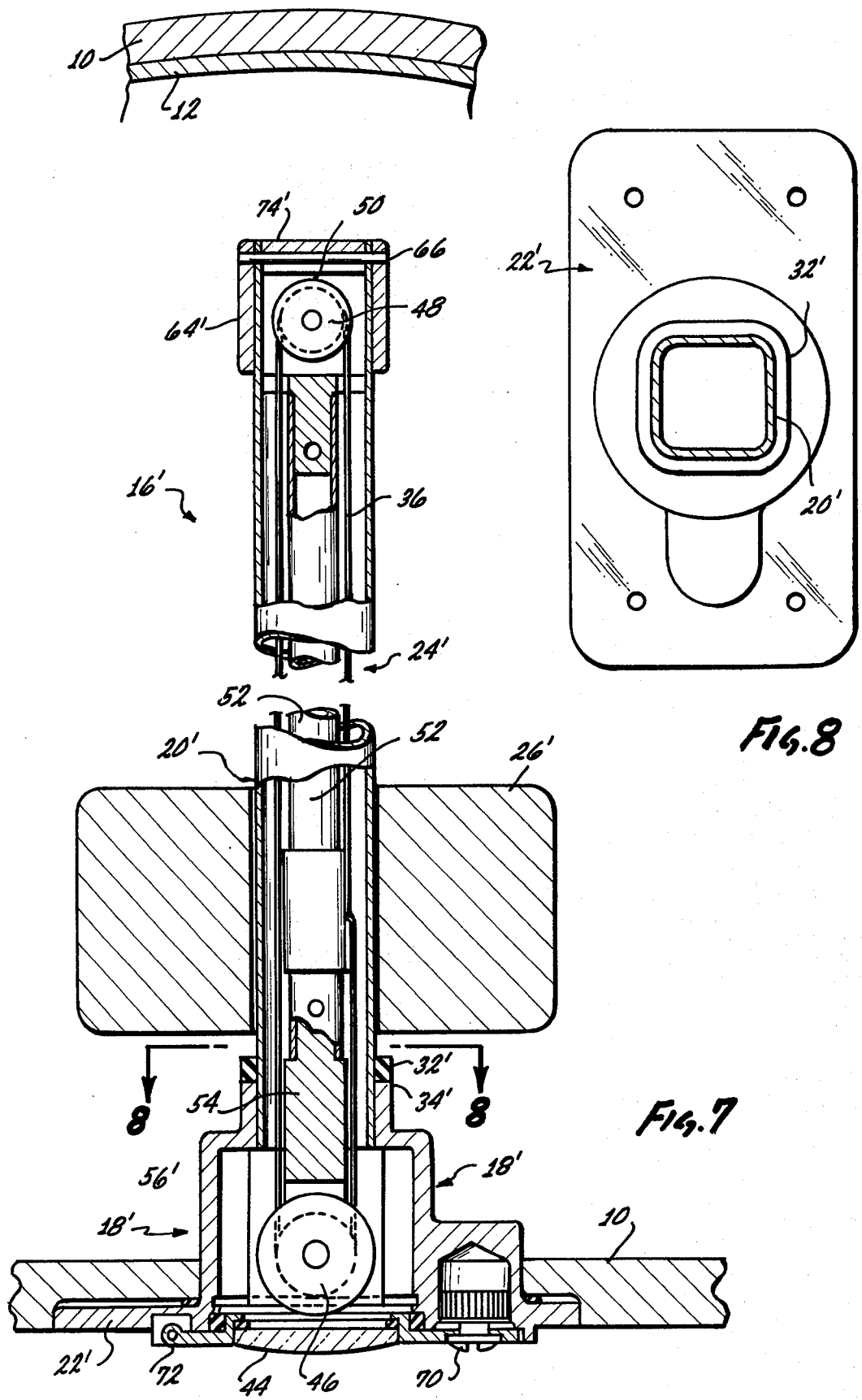

DIRECT READING TANK GAUGE

BACKGROUND OF THE INVENTION

1. Field of the Invention

The invention relates generally to means for measuring the level of liquid in a tank and particularly to a direct reading gauge providing visual access to the gauge element from the exterior of the tank although the apparatus itself is not exposed to the contents of the tank. A true indication of the liquid level is visually signalled by reading a flexible, endless tape loop through a window.

The invention is concerned with the provision of a flexible, endless loop band or tape member having magnetic armature means capable of moving within an outer housing extending into a tank. The interior of the housing is sealed off from the contents of the tank. A float on the outside of the housing carries means for magnetically attracting the magnetic armature means of the gauge element. Tape guide rollers are provided at opposite ends of the interior of the housing and maintain the endless loop under full extension.

2. Description of the Prior Art

It has been well known in the past to use solid, substantially rigid but lightweight rods which are tubular, square or rectangular or, in a copending application assigned to the assignee, a flexible, tape-like gauge member which is made of plastic or other light-weight materials, which can be printed or embossed in a rotary type printing apparatus. Typical stick gauges are disclosed, for example in the patents to H. Nussbaum, U.S. Pat. Nos. 3,407,660 and 3,572,122, assigned to a predecessor in interest of the assignee of the present invention. Of additional interest is the patent to J. H. Field, et al., U.S. Pat. No. 2,949,776, also assigned to the predecessor in interest of the assignee herein.

A common problem to these devices is that they must extend from the tank body when in use. A failure to secure the gauge assembly after use will permit the gauge to extend at inopportune times, thereby increasing the risk of damage or breakage. Moreover, such devices generally require a tool, which may be simply a coin, to release the gauge mechanism so that it can be read.

Another problem common to all "stick-type" gauges which are generally read by a local ground crew is that arising from communication and training. Since aircraft now fly all over the world, some ground crews are better trained and more dependable than others. However, language barriers contribute to the difficulty of obtaining reliable information as to the status of the fuel during any stopover.

Reports of aircraft departing with insufficient fuel on board can not be discounted. Whether this is caused by an inability to read the gauge or an inability to communicate the results is never clear. The dangers to the aircraft are extraordinary. Therefore it is sufficient to say that what is needed is a gauge that can be visually read by any member of the flight crew while making a routine inspection of the aircraft.

SUMMARY

According to the present invention, these above-mentioned problems are overcome by employing a flexible, endless loop gauge member which can be made of plastic or other lightweight and flexible material, such as aluminum or even steel.

In either embodiment, a rotary type printing process could be used to either print or emboss the measuring indicia upon the gauge element.

An armature is fixed to the endless loop. The loop is mounted within a tube that extends into the tank with rollers at opposite ends of the loop. Tensioning elements may be provided if necessary to keep the loop taut. As in the prior art gauges, a float device containing a permanent magnet is mounted on the tube and the armature tends to align itself with the float, revolving the tape loop.

A viewing window, which may be a lens, is placed at the exterior end of the tube so that the indicia on the tape can be viewed at all times without special tools or manipulation of the gauge. The improved endless loop gauge apparatus can be dimensioned to replace existing stick gauge installations.

The indicia on the loop will, of course, have to be intended for the particular orientation since the float adjacent the viewing window at the "top" of the tank would signal a full tank while the same orientation in a "bottom" installation would signal "empty."

Other novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be understood, however, that the drawings are for the purpose of illustration and description only, and are not intended as a definition of the limits of the invention.

BRIEF DESCRIPTION OF THE DRAWINGS

FIG. 1 is a cross-sectional view of an aircraft wing with a tank having gauge means embodying the invention mounted therein;

FIG. 2 is an end view of the gauge according to a preferred embodiment of the present invention;

FIG. 4 is a cross-section view of the gauge element of FIG. 3 taken along the line 4—4 in the direction of the appended arrows;

FIG. 7 is a side section view of an alternative embodiment of the gauge;

FIG. 8 is a cross section view of the gauge of FIG. 7 taken along line 8—8 in the direction of the appended arrows;

DESCRIPTION OF THE PREFERRED EMBODIMENT

Figure 3:
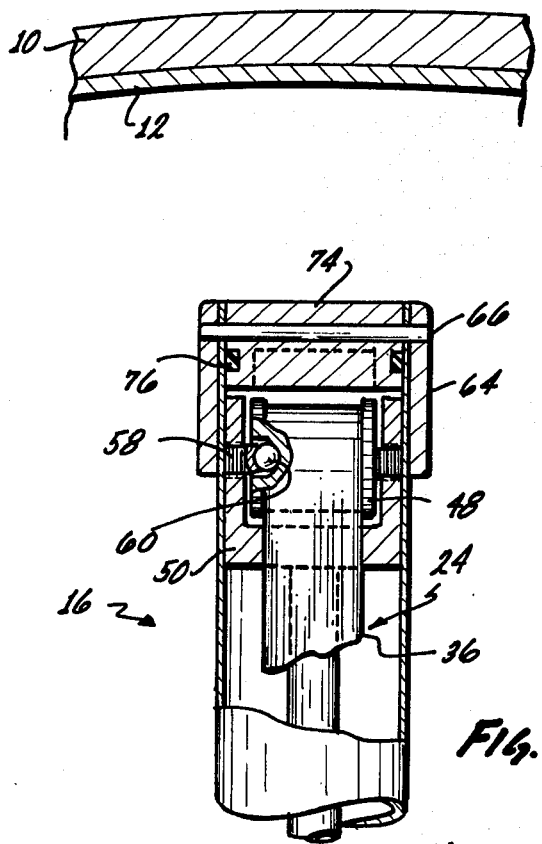
FIG. 3 is a side view, partly in section of the gauge of FIG. 1.

More particularly describing the invention and referring first to FIG. 1, there is shown an aircraft wing 10 in which a tank 12 is installed and shown in cross-section. The tank 12 can be considered as capable of being closed and customarily containing a liquid 14. Gauge means 16 embodying the invention is shown mounted at the bottom of the tank 12.

The gauge means 16 includes generally an outer assembly or gauge housing 18 comprising a "interior" housing section 20 within the tank 12 and an exterior housing section 22 outside of the tank 12 and mounted in the wing 10; an endless tape loop inner assembly 24 that is mounted in the housing 20; a float 26; and, as will later be described, armature means for orienting the tape loop vertically with relation to the float 26.

The outer or exterior housing section 22, is mounted to the wing 10 and a service hatch 28, that seats in the exterior housing section 22, is secured with a quarter turn fastener 29.

The float 26, which is designed to float upon the liquid 14 in the tank 12 and be guided by the gauge housing 20 as it rises and falls, is generally annular in shape to receive the housing 20. The float 26 may have a hollow chamber within which a pair of permanent magnets 30 is placed, separated by the diameter of the opening. Alternatively, the float 26 may be of a low density foam in which the magnets 30 are contained.

A float support member, shown here as a resilient collar 32, rests on a shoulder 34 of the housing to cushion and limit movement of the float 26 in the event the liquid 14 in the tank 12 should fall to a very low level. The rapid fall of liquid or landing shock may also cause the float 26 to impact on the collar 32.

In the preferred embodiment, the gauge housing lower section 20 has a round cross-section and the float 26 also has a round opening to fit.

The tape loop assembly 24 includes an endless tape 36, that is attached to an armature element 38 that cooperates with the float element 26 to link the two together magnetically.

Indicia 40 (better seen in FIG. 2) may be imprinted or embossed on the tape member 36, corresponding to the tank in which it is to be utilized. Obviously, if the tank were perfectly symmetrical, then the individual indicia 40 would be equally spaced. Alternatively, if the tank were not perfectly symmetrical, then the gauge would be calibrated to reflect accurately the quantity of liquid in the tank as a function of the liquid level.

Since the float 26 and its associated magnetic elements 30 is positioned at the surface of the liquid 14, in operation, the armature 38 and magnetic elements 30 interact and become attracted to each other. At this point, the tape 36 will be held in place by the magnetic forces and the volume of liquid 14 stored in the tank 12 can be read from the exposed indicia 40 through the viewing window 44.

The tape loop assembly 24 includes a lower tape guide roller 46 and an upper tape guide roller 48. The upper roller 48 is supported on a yoke assembly 50 which fits in the end of a support tube 52. The support tube 52 is attached to a lower yoke 54 which is held by the base 56 of the assembly.

The tape 36 extends around the lower tape guide roller 46 and the upper tape guide roller 48. The tape ends are spliced and held at the armature 38. The upper and lower guide rollers 46 and 48 are coupled to their respective yokes by retainers 58 which hold rotatable ball bearings 60 (best seen in FIG. 3) which permit lower rolling friction as the spools rotate. An upper collar 64 is fastened to the interior housing 20 of the housing 18 with a pin 66. The assembly of the end section is better seen in FIG. 3. The upper collar 64 limits movement of the float 26.

In the event that the armature 38 is decoupled from the float 26 and its magnets 30, the armature 38 will fall to the bottom of the assembly. The tape 36 may have special markings to indicate that the fluid level is not being displayed. For this situation, the lower guide roller 46 is provided with extended flanges 68 which can be manually operated to move the tape and the armature 38 until it is engaged by the magnetic field of the float 26.

In order to gain access to the flanges 68, the service hatch 28 is provided with a fastener 29 which, when released, permits the hatch 28 to rotate on a hinge pin 72. When the armature 38 is again held by the magnetic field of the float 26, the service hatch 28 may be closed and the fastener 29 reengaged so that the gauge can again be read through the window 44.

The details of the service hatch 28 are better seen in connection with FIG. 2 which is the view that would be provided to someone reading the gauge. FIG. 3 is a side view, partially in section of FIG. 1 but rotated 90° so that the axes of the upper and lower rollers are in the plane of the drawing.

The interior of the housing 20 is sealed by a plug 74 which can be bonded to the interior of the tube. Alternatively, the plug 74 can be fitted with an O-ring 76 and is secured in place by a pin 66.

A removable retaining ring or threaded collar 78 holds the interior housing portion 20 within the exterior housing portion 22. By removing the collar 78 with the service hatch 28 open, the entire tape loop assembly 24 can be removed as a unit for service or replacement.

As seen in FIG. 4, the preferred embodiment of the gauge of the present invention employs a round interior section 20 and the interior opening of the float 26 is shaped to fit closely over the round tube. In alternative embodiments, other shapes, including a square or other noncircular shapes can be employed. These noncircular shapes may provide improved magnetic engagement between the permanent magnets 30 of the float 26 and the armature member 38. The shape of the tube extending into the tank is not of great importance and it has been found that the circular shape provides somewhat more flexibility in manufacturing.

Figure 5:
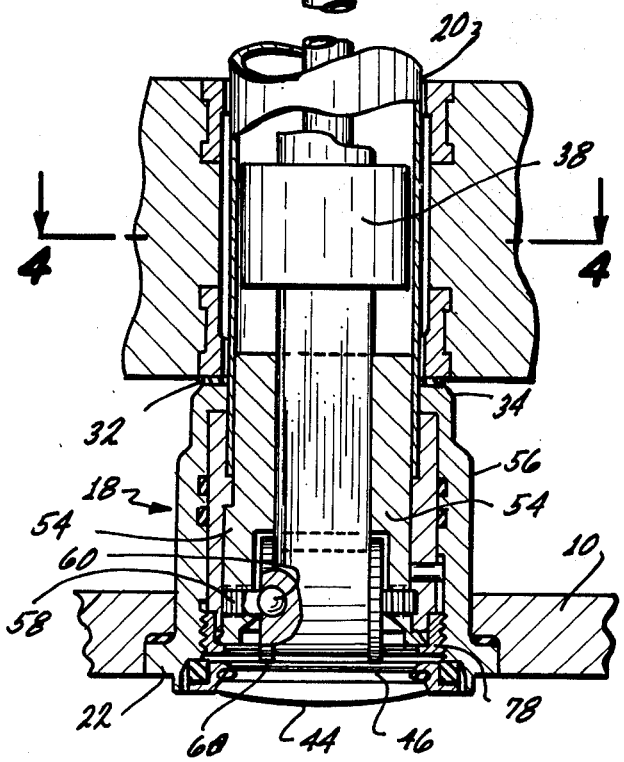
FIG. 5 is a side section view of the armature of FIG. 4.

Turning also to FIG. 5, there is shown, in somewhat greater detail, the structure of the armature assembly 38. As seen, the armature assembly 38 includes a magnetizable ring 80 which is just smaller than the inside diameter of the tube 20. An armature support member 82 is generally oblong and slides on the support tube 52. The ring 80, which passes over the guide rollers, can be press fitted onto the support member 82 after the tape loop is in place. As seen in FIG. 3, the rollers 46, 48 are easily removed for the installation or removal of a tape loop. The tape 36 is spliced into a loop and the splice is used in connection with a wedge 84 which fits between the ring 80 and the support member 82 to lock the tape into the armature assembly 38.

The armature support member 82 is in sliding contact with the support tube 52. The armature assembly 38 also provides a tape guide by having a shallow slot 86, which is substantially the width of the tape, on the surface of the armature support member 82 opposite the tape retaining wedge 84.

Tape tensioning means can be provided, if necessary, to assure smooth manual rotation of the tape loop by manual rotation of the extended flanges 68 of the lower roller 46. Obviously, too much tension will cause the spools to bind on their supporting rolling balls. Insufficient tension will tend to defeat manual operation when it is necessary to restore magnetic interaction, once the field has been broken.

The outer surface of the interior section 20 is made to be as low friction as possible. Similarly, the interior surface of the float 26 is made of a low friction material so that the float can easily rise and fall with the fluid level. This low friction contact makes possible the use of the gauge in nonvertical orientations. The gauge will operate in virtually any orientation so long as there is a component in the vertical or G direction.

In alternative designs of the armature assembly, rolling balls are provided between the armature support member and the support tube, facilitating the use of the gauge in nonvertical installations.

Figure 6:
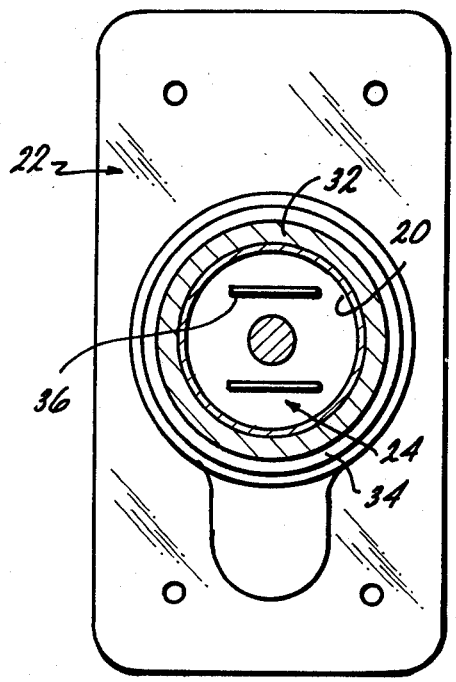
FIG. 6 is a section view of the gauge of FIG. 4 taken along line 6—6 in the direction of the appended arrows.

FIG. 6 shows, in somewhat better detail, the portion of the exterior section 22 that extends into the aircraft tank 12. The resilient collar 32 is fitted on the shoulder 34. The interior section 20 contains the lower yoke 54 with its guide roller 46 and its extended flange 68.

As noted above, a possible alternative embodiment would include a gauge of noncircular cross section. Such an alternative gauge 16' is illustrated in FIGS. 7 through 10 below. For convenience in description, identical parts have been given the same reference numbers while similar parts have primed reference numbers appended thereto.

Figure 10:
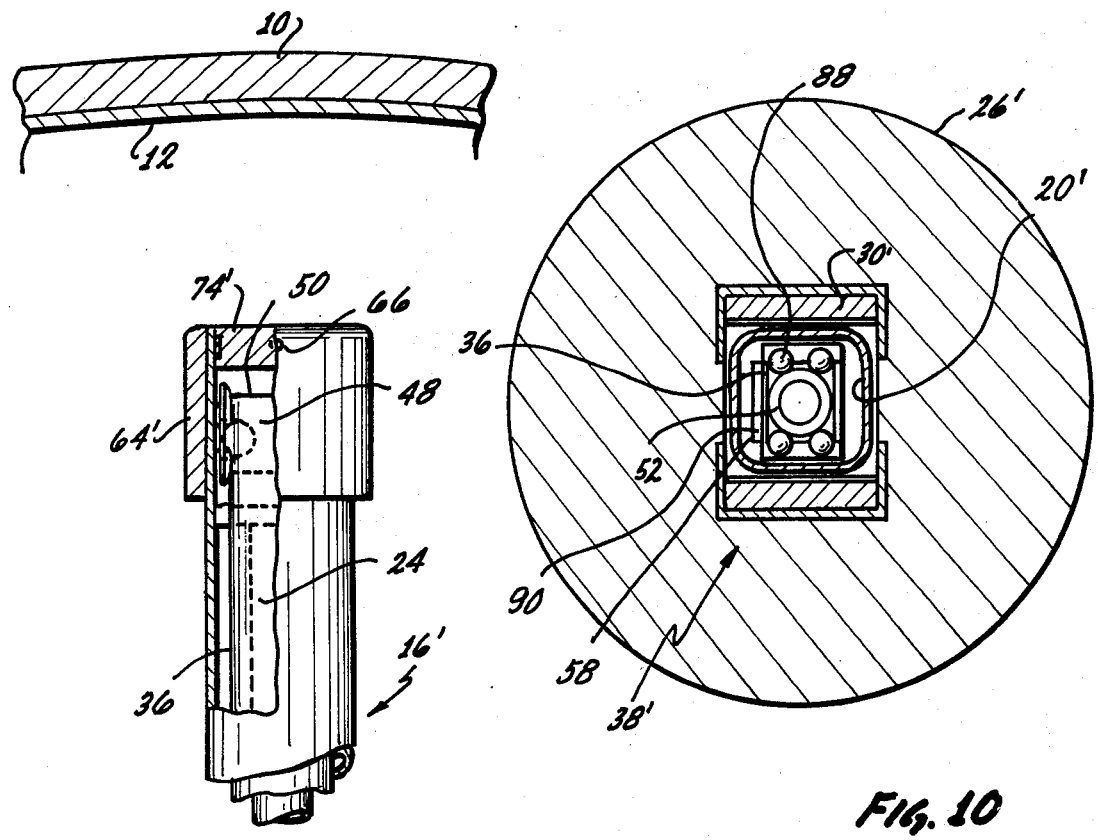
FIG. 10 is a section view of the float and armature assembly taken along line 10—10 of FIG. 9 in the direction of the appended arrows.
Figure 9:
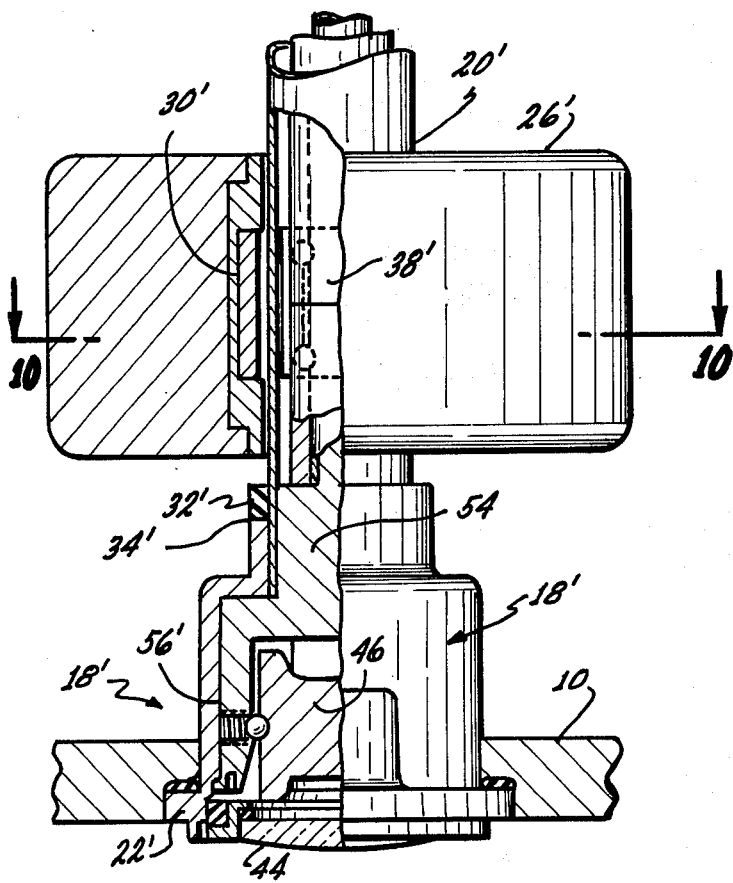
FIG. 9 is a side section view of the gauge of FIG. 7 rotated through 90°.

Turning to FIG. 7, the only notable difference in structure is the provision of a square interior housing unit 20'. The collar 64' is also square as is the plug 74'. The float magnets 30' as seen in FIGS. 9 and 10 can be flat or bar magnets. The description of the views of FIGS. 8 and 9 are substantially identical to the earlier description of FIGS. 4 and 3, respectively.

In FIG. 10, there is shown an alternative armature assembly 38' which includes a plurality of balls 88 which ride on the support tube 52. A plate 90 holds the tape 36 to the armature assembly 38'. The armature assembly 38' is generally rectangular to fit and operate within the square interior housing 20'.

In use, the gauge of the present invention can be installed in much the same fashion as existing "stick" gauges and will occupy substantially the same space in the interior of a tank. The gauge can be installed to be used on the top surface of a tank or, with equal facility, on the bottom surface of a tank. Naturally, the tape would display one reading for the float at the collar 64 when installed at the top of the tank and a different reading when the gauge is installed at the bottom of the tank.

Generally, however, the float remains at the surface of the liquid. As the liquid level changes, the position of the float changes relative to the tube and, through magnetic coupling, the armature moves with the float. Because the armature is attached to an endless tape loop, the tape moves with the armature and an appropriate reading is provided at the viewing window, representing the liquid level in the tank. With the present invention, a quantitative reading of the level of the tank's contents can be directly observed by visual inspection.

With the gauge of the present invention, it is no longer necessary to release a stick gauge, nor is a stick gauge employed which requires, at least, some manual operation. Only in the event that the armature is decoupled from the float, is it necessary to manually "reset" the gauge. However, this is easily accomplished by opening a service hatch and manually rotating the lower roller until the armature has been magnetically engaged by the float.

Other variations and embodiments will occur to those skilled in the art in accordance with the teachings and, therefore, the scope of the invention should be limited only by the breadth of the claims appended hereto.

What is claimed as new is:

1. A direct reading liquid level gauge comprising:
   (a) a housing member adapted to be inserted into a tank;
   (b) a float member slidably mounted on said housing member including magnetic means, said float member adapted to follow the surface of the fluid whose level is to be signalled;
   (c) endless display tape loop means having display indicia printed on the outer surface thereof, mounted in a display tape assembly within said housing member;
   (d) armature means, permanently fastened to said endless tape loop means and adapted to interact magnetically with said float member magnetic means;
   (e) tape guide means including support rollers mounted within said housing member for allowing free movement of said tape loop means;
   (f) window means, attached to said housing member and adjacent one of said support rollers for viewing said tape loop and the indicia printed thereon, said window means including hinge and latch means for opening said window means to provide access to said tape guide means; said support roller adjacent said window means including extended flanges, and
   (g) removable retaining ring means for releasably retaining said display tape loop means, armature means and tape guide means within said housing member, whereby said window means, when opened, affords access to said retaining ring means for removal of the ring means and the entire display tape assembly, and whereby said support roller is manually actuable for restoring magnetic interaction between said armature means and said float member magnetic means, and whereby said display indicia corresponding to the position of said float member, and said armature means magnetically coupled thereto, are visible in said window means.

2. The apparatus of claim 1, above, wherein said armature means further includes a tape guide for enclosing tape between said support roller means.

3. The apparatus of claim 1, above wherein said housing member is cylindrical.

4. The apparatus of claim 1, above wherein said housing member is an oblate cylinder.

5. The apparatus of claim 1, above, wherein said housing member is a straight sided prism.

6. The apparatus of claim 1, above, wherein said window means includes a lens member for magnifying the display indicia printed on said tape loop.

7. The apparatus of claim 1, above, wherein said tape guide support rollers include rolling bearings to minimize rotational friction.

8. The apparatus of claim 1, above, wherein said housing member outer surface is provided with a low friction coating to facilitate the sliding of said float member.

9. The apparatus of claim 1, above, said float member magnetic means including first and second diametrically opposed pole pieces adjacent said housing member.

10. The apparatus of claim 1, above, further including a support member separating said support rollers between opposite ends of said housing member.

11. The apparatus of claim 10, above, wherein said armature means are coupled to said support member with rolling bearings to minimize friction therebetween as said armature means follows said float member.

* * * * *